United States Patent
Bachelder

(10) Patent No.: US 12,493,987 B2
(45) Date of Patent: Dec. 9, 2025

(54) CALIBRATION-LESS STRUCTURED LIGHT MEASUREMENT

(71) Applicant: Cognex Corporation, Natick, MA (US)

(72) Inventor: Ivan Bachelder, Hillsborough, NC (US)

(73) Assignee: Cognex Corporation, Natick, MA (US)

( * ) Notice: Subject to any disclaimer, the term of this patent is extended or adjusted under 35 U.S.C. 154(b) by 487 days.

(21) Appl. No.: 18/071,089

(22) Filed: Nov. 29, 2022

(65) Prior Publication Data

US 2023/0169687 A1 Jun. 1, 2023

Related U.S. Application Data

(60) Provisional application No. 63/284,050, filed on Nov. 30, 2021.

(51) Int. Cl.
*G06T 7/80* (2017.01)
*G06T 7/60* (2017.01)

(52) U.S. Cl.
CPC ............... *G06T 7/80* (2017.01); *G06T 7/60* (2013.01); *G06T 2207/10028* (2013.01)

(58) Field of Classification Search
CPC .... G06T 7/80; G06T 7/60; G06T 2207/10028
USPC ....................................................... 382/100
See application file for complete search history.

(56) References Cited

U.S. PATENT DOCUMENTS

| 2016/0134860 A1* | 5/2016 | Jovanovic | G01B 11/25 348/50 |
| 2020/0105019 A1* | 4/2020 | Boyle | H04N 23/90 |

OTHER PUBLICATIONS

Muñoz-Rodríguez, J. Apolinar, Anand Asundi, and Ramon Rodriguez-Vera. "Shape detection of moving objects based on a neural network of a light line." Optics communications 221.1-3 (2003): 73-86. (Year: 2003).*

(Continued)

*Primary Examiner* — Jonathan S Lee
(74) *Attorney, Agent, or Firm* — Wolf, Greenfield & Sacks, P.C.

(57) ABSTRACT

The techniques described herein relate to methods, apparatus, and computer readable media for measuring object characteristics by interpolating the object characteristics using stored associations. A first image of at least part of a ground surface with a first representation of a laser line projected onto the ground surface from a first pose is received. A first association between a known value of the characteristic of the ground surface of the first image with the first representation is determined. A second image of at least part of a first training object on the ground surface with a second representation of the laser line projected onto the first training object from the first pose is received. A second association between a known value of the characteristic of the first training object with the second representation is determined. The first and second association for measuring the characteristic of a new object are stored.

21 Claims, 18 Drawing Sheets

(56) References Cited

OTHER PUBLICATIONS

Vilchez-Rojas, Heyner L., Juan A. Rayas, and Amalia Martínez-García. "Use of white light profiles for the contouring of objects." Optics and Lasers in Engineering 134 (2020): 106295. (Year: 2020).*

Xu, Guan, et al. "Optimization reconstruction method of object profile using flexible laser plane and bi-planar references." Scientific Reports 8.1 (2018): 1526. (Year: 2018).*

Wei, Zhenzhong, et al. "Parallel-based calibration method for line-structured light vision sensor." Optical Engineering 53.3 (2014): 033101-033101. (Year: 2014).*

* cited by examiner

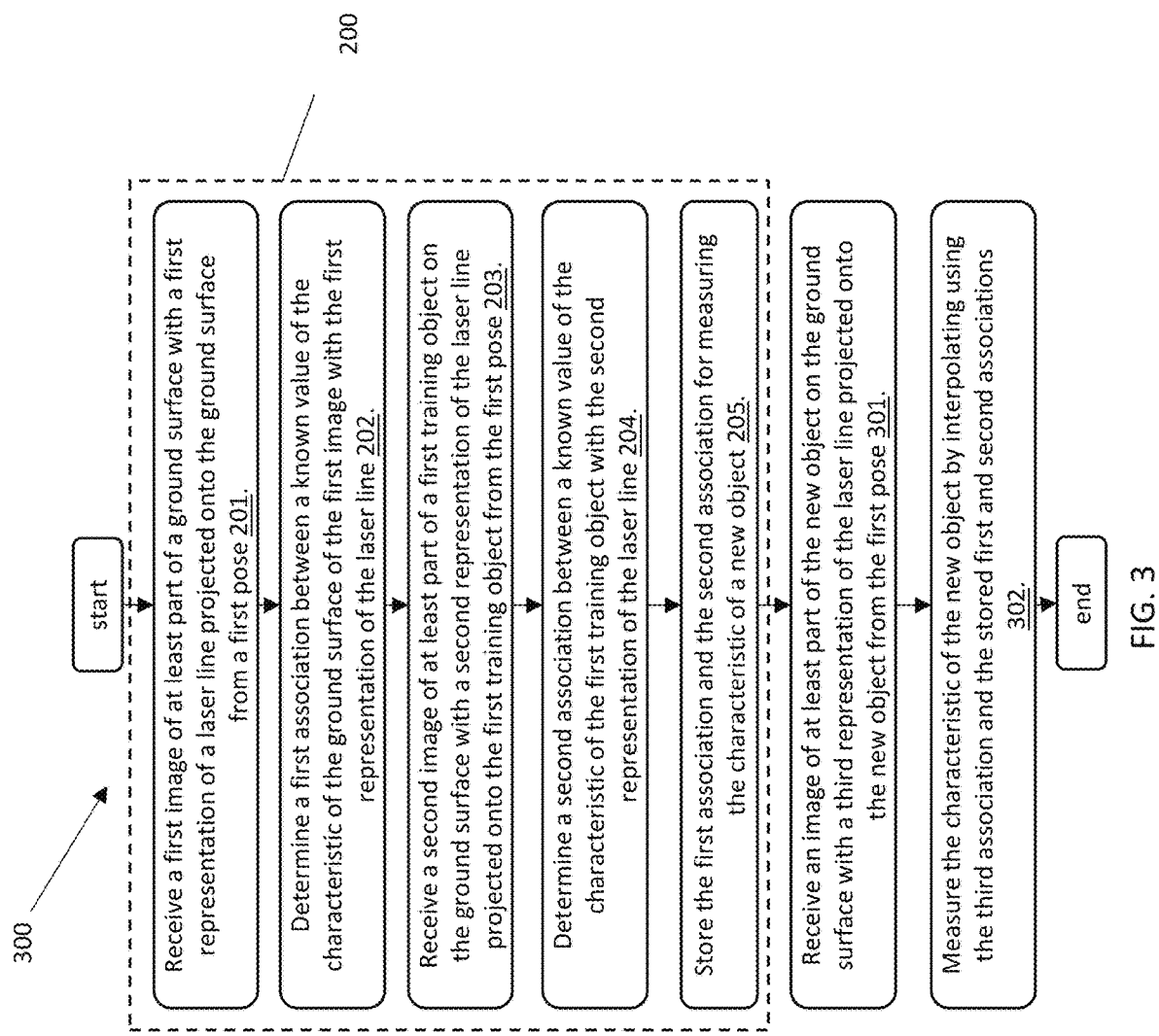

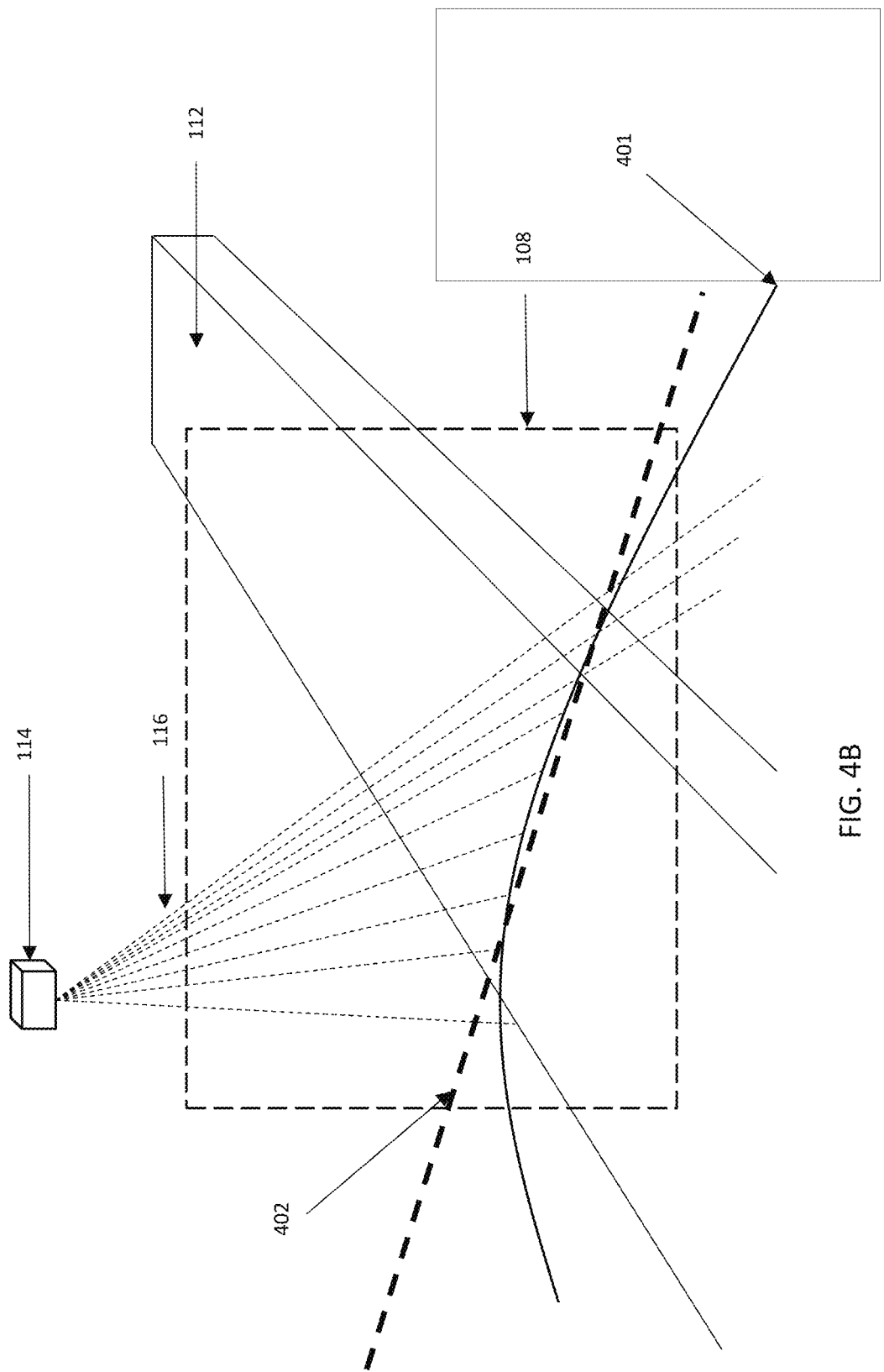

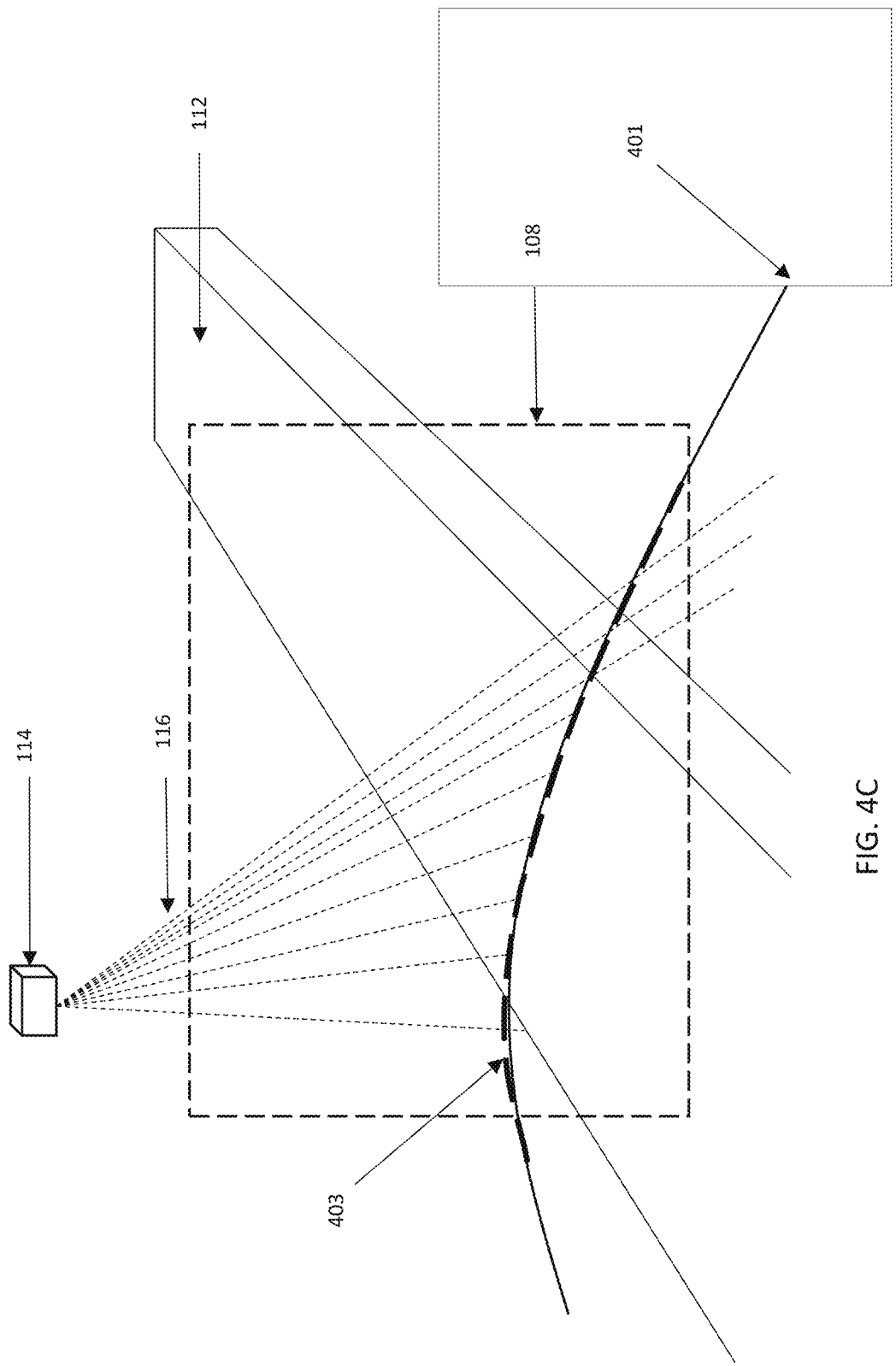

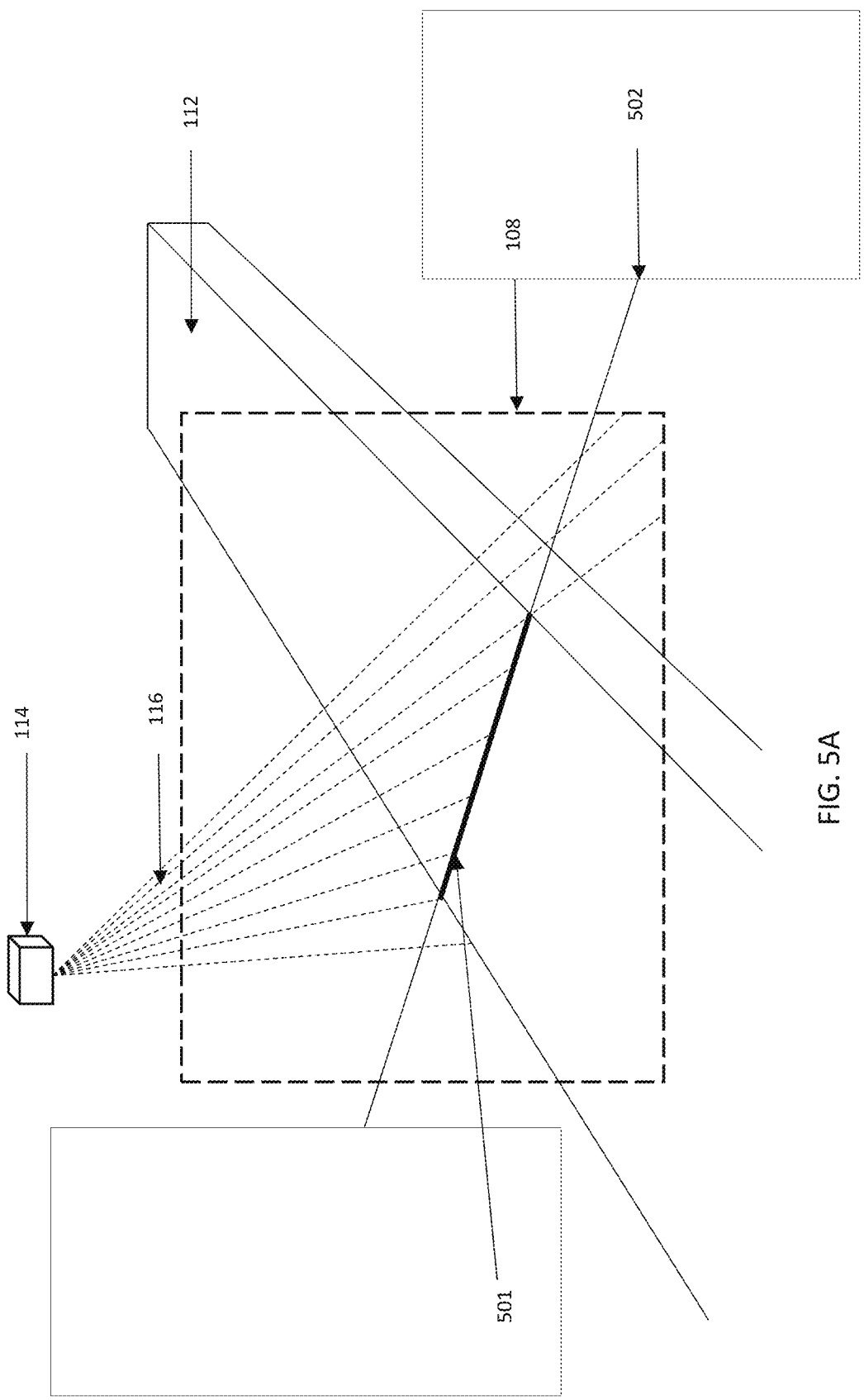

| Index 652 | Representation of Laser Line Projection on Ground Surface 654 | Representation of Laser Line Projection on First Training Object 656 |
|---|---|---|
| 0 | -2010.3, 1506 | -2030.3, 1606 |
| 1 | -2001.7, 1405 | -2021.7, 1505 |
| 2 | -1906.3, 1303 | -1946.3, 1403 |
| 3 | -1845.5, 1202 | -1875.5, 1302 |
| 4 | -1797.4, 1104 | -1827.4, 1204 |
| 5 | -1732.2, 1002 | -1782.2, 1102 |
| 6 | -1666.7, 923 | -1696.7, 1023 |

FIG. 6C

| Index 752 | Representation of Laser Line Projection on Ground Surface (height = 0) 754 | Representation of Laser Line Projection on First Training Object (height = 3) 756 | Representation of Laser Line Projection on Second Training Object (height = 1) 758 |
|---|---|---|---|
| 0 | -2010.3, 1506 | -2030.3, 1606 | -220.3, 1556 |
| 1 | -2001.7, 1405 | -2021.7, 1505 | -2011.7, 1455 |
| 2 | -1906.3, 1303 | -1946.3, 1403 | -1926.3, 1353 |
| 3 | -1845.5, 1202 | -1875.5, 1302 | -1865.5, 1252 |
| 4 | -1797.4, 1104 | -1827.4, 1204 | -1817.4, 1154 |
| 5 | -1732.2, 1002 | -1782.2, 1102 | -1772.2, 1052 |
| 6 | -1666.7, 923 | -1696.7, 1023 | -1676.7, 963 |

FIG. 7C

Table 793:

| Index 793A | Representation of Laser Line Projection on Ground Surface (height = 0) 793B | Representation of Laser Line Projection on First Training Object at an nth position (height = 3) 793C | Representation of Laser Line Projection on Second Training Object at an nth position (height = 1) 793D |
| --- | --- | --- | --- |
| 0 | -2010.3, 1506 | -230.3, 1606 | -220.3, 1656 |
| 1 | -2001.7, 1405 | -221.7, 1505 | -2011.7, 1555 |
| 2 | -1906.3, 1303 | -946.3, 1403 | -1926.3, 1453 |
|   |               | -875.5, 1302 | -1865.5, 1452 |
|   |               | -827.4, 1204 | -1817.4, 1254 |
|   |               | -282.2, 1102 | -1772.2, 1152 |
|   |               | -696.7, 1023 | -1676.7, 1063 |

Table 792:

| Index 792A | Representation of Laser line Projection on Ground Surface (height = 0) 792B | Representation of Laser Line Projection on First Training Object at a second position (height = 3) 792C | Representation of Laser Line Projection on Second Training Object at a second position (height = 1) 792D |
| --- | --- | --- | --- |
| 0 | -2010.3, 1506 | -2030.3, 1606 | -220.3, 1576 |
| 1 | -2001.7, 1405 | -2021.7, 1505 | -2011.7, 1485 |
| 2 | -1906.3, 1303 | -1946.3, 1403 | -1926.3, 1373 |
| 3 | -1845.5, 1202 | -1875.5, 1302 | -1865.5, 1282 |
|   |               |               | 74 |
|   |               |               | 82 |
|   |               |               | 3 |

Table 791:

| Index 791A | Representation of Laser Line Projection on Ground Surface (height = 0) 791B | Representation of Laser Line Projection on First Training Object at a first position (height = 3) 791C | Representation of Laser Line Projection on Second Training Object at a first position (height = 1) 791D |
| --- | --- | --- | --- |
| 0 | -2010.3, 1506 | -2030.3, 1606 | -220.3, 1556 |
| 1 | -2001.7, 1405 | -2021.7, 1505 | -2011.7, 1455 |
| 2 | -1906.3, 1303 | -1946.3, 1403 | -1926.3, 1353 |
| 3 | -1845.5, 1202 | -1875.5, 1302 | -1865.5, 1252 |
| 4 | -1797.4, 1104 | -1827.4, 1204 | -1817.4, 1154 |
| 5 | -1732.2, 1002 | -1782.2, 1102 | -1772.2, 1052 |
| 6 | -1666.7, 923  | -1696.7, 1023 | -1676.7, 963  |

CALIBRATION-LESS STRUCTURED LIGHT MEASUREMENT

RELATED APPLICATIONS

This Application claims priority under 35 U.S.C. § 119(e) to U.S. Provisional Application Ser. No. 63/284,050, titled "CALIBRATION-LESS STRUCTURED LIGHT MEASUREMENT," filed on Nov. 30, 2021, which is herein incorporated by reference in its entirety.

TECHNICAL FIELD

The techniques described herein relate generally to methods and apparatus for measuring characteristics of an object captured in images, including techniques for calibration-less structured light measurement by measuring object characteristics by interpolating the object characteristics using stored associations.

BACKGROUND OF INVENTION

Imaging systems can use laser striping to determine various characteristics about an object in one or more images. For example, imaging systems may be configured to determine characteristics such as the presence or absence of an object, an estimation for optimal parameters for reading symbols (e.g., for barcodes, module size) or characters (e.g., stroke width), the height or other characteristic(s) of the object (e.g., width, depth, etc.), and/or the like. However, methods for determining characteristics using laser striping typically employ computations, such as triangulation computations, that require additional data such as the precise 2D or 3D relationships among the camera, the laser emitting device, and the ground surface with respect to which measurements of the object must be reported. For some systems, such as turnkey systems, some of these relationships are set or measured during the manufacturing process, but the remaining relationships must be measured onsite, which typically requires performing a calibration procedure, and often further necessitates the use of dedicated calibration equipment (e.g., a checkerboard calibration plate). Moreover, if the relationships change unexpectedly (for example if the system gets bumped), the calibration procedure must be repeated. Some systems may additionally or alternatively require the camera and laser emitter device to have simple relative geometry relative to each other, often achieved by mounting the camera such that the optical axis is nearly perpendicular to the ground surface and the imaging field-of-view is nearly aligned with the laser emitting device.

SUMMARY OF INVENTION

In accordance with the disclosed subject matter, apparatus, systems, and methods are provided for improved techniques for measuring characteristics of objects. In particular, some aspects relate to a computerized method for measuring a characteristic of an object. The method includes receiving, from an imaging device, a first image of at least part of a ground surface with a first representation of a laser line projected onto the ground surface from a first pose. The method includes determining a first association between a known value of the characteristic of the ground surface of the first image with the first representation of the laser line projected onto the ground surface, receiving, from the imaging device, a second image of at least part of a first training object on the ground surface with a second representation of the laser line projected onto the first training object from the first pose, determining a second association between a known value of the characteristic of the first training object with the second representation of the laser line projected onto the first training object, and storing the first association and the second association for measuring the characteristic of a new object.

According to some examples, the computerized method includes receiving, from the imaging device, an image of at least part of the new object on the ground surface with a third representation of the laser line projected onto the new object on the ground surface from the first pose, and measuring the characteristic of the new object by interpolating using the third association and the stored first association and second association.

According to some examples, the first representation and/or the second representation are linear approximations and wherein interpolating comprises linear interpolation.

According to some examples, the first representation and the second representation comprise first and second parametrized curves, respectively, and wherein interpolating comprises interpolating between the first and second curves.

According to some examples, the first representation and the second representation comprise first and second sets of points, respectively, and wherein interpolating comprises interpolating between points of the first and second sets of points.

According to some examples, the laser line projected onto the ground surface is projected using a laser emitting device.

According to some examples, the method includes receiving, from the imaging device, a third image of at least part of a second training object on the ground surface with a third representation of the laser line projected onto the second training object from the first pose, determining a third association between a known value of the characteristic of the second training object with the third representation of the laser line projected onto the second training object, and storing the third association for measuring the characteristic of the new object.

According to some examples, the third representation intersects with the first representation and/or the second representation at a vanishing point.

According to some examples, the characteristic is a distance above the ground surface.

According to some examples, interpolating comprises determining whether the third representation is between the first representation and the second representation.

According to some examples, the characteristic indicates detectability if the third representation is determined to be between the first representation and the second representation.

According to some examples, the characteristic is an optimal parameter value for reading a symbol on a surface of the first training object.

According to some examples, the characteristic is a module size for a symbol on a surface of the first training object.

According to some examples, the method includes moving the imaging device and/or laser emitting device from a first position to a second position; receiving, from the imaging device, a third image of at least part of the ground surface with a third representation of a laser line projected onto the ground surface from a second pose; determining a third association between a known value of the characteristic of the ground surface of the third image with a third representation of the laser line projected onto the ground surface; receiving, from the imaging device, a fourth image of at least part of a first training object on the ground surface with the fourth representation of the laser line projected onto the first training object from the second pose; determining a fourth association between a known value of the characteristic of the first training object with the fourth representation of the laser line projected onto the first training object; and storing the third association and the fourth association for measuring the characteristic of the new object.

According to some examples, the method includes receiving, from the imaging device, an image of at least part of the new object on the ground surface with a fifth representation of the laser line projected onto the new object on the ground surface from the first pose; and measuring the characteristic of the new object by interpolating using the fifth association and the stored first association, second association, third association and/or fourth association.

According to some examples, interpolating is performed using principles of perspective projection.

According to some examples, the method includes determining a mapping using the known value of the characteristic of the ground surface, the known value of the characteristic of the first training object, a difference in the first position and second position, and points corresponding to the surface of the new object.

According to some examples, the characteristic is a height, and wherein the mapping is a two dimensional (2D) mapping of the heights of the points corresponding to the surface the new object represented as a point cloud.

According to some examples, the first training object is a box.

Some embodiments relate to a system comprising a memory storing instructions, and a processor configured to execute the instructions to perform the method of any of the embodiments herein.

Some embodiments relate to a non-transitory computer-readable media comprising instructions that, when executed by one or more processors on a computing device, are operable to cause the one or more processors to execute the method of any of the embodiments herein.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 3 is a flow chart showing an exemplary computerized method for measuring a surface characteristic of an object.

FIG. 4B is a diagram showing a representation of the exemplary laser line projection of FIG. 4A as a line, according to some embodiments.

FIG. 4C is a diagram showing a representation of the exemplary laser line projection of FIG. 4A as a curve, according to some embodiments.

FIG. 5A is a diagram showing a laser line projection on a ground surface at a first position, according to some embodiments.

FIG. 6C is a diagram showing an example of stored associations, according to some embodiments.

FIG. 7C is a diagram showing an example of stored associations, according to some embodiments.

FIG. 7D is a diagram showing an example of stored associations, according to some embodiments.

DETAILED DESCRIPTION OF INVENTION

Figure 1:
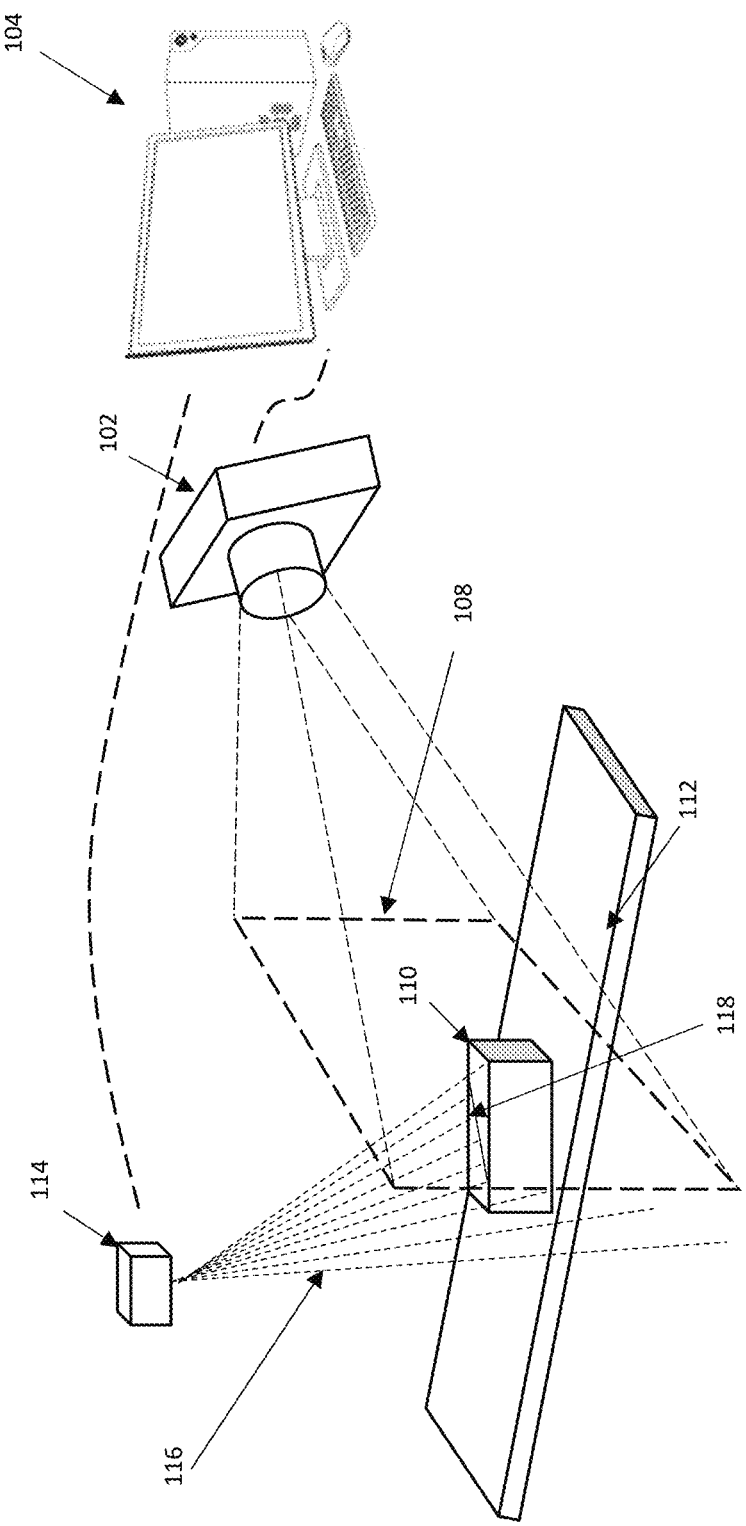
FIG. 1 is a diagram showing an exemplary system for measuring a characteristic of objects captured in images, according to some embodiments.

The techniques described herein can be used to determine characteristics of an object captured in images, including techniques for measuring object characteristics by interpolating the object characteristics using stored associations. The inventors have appreciated that conventional techniques and systems may suffer from significant inefficiencies by employing (often complex) computations that require precise knowledge of the spatial 3D relationships between the different components of the system (e.g., the camera, laser emitting device, and/or the ground surface) with respect to each other. Therefore, such systems can be time consuming to properly configure and may also require significant processing resources to determine characteristics of objects in images. Some techniques attempt to set or measure the 3D relationships during manufacturing of the system, but the remaining relationships must be measured onsite using an often-tedious calibration procedure, and further necessitates the usage of dedicated calibration equipment as explained above. Moreover, if the positional relationships between the components of the system change unexpectedly, the calibration procedure must be repeated. Therefore, while such systems provide useful data, they often require specific calibration methods and dedicated equipment, and/or require the camera and laser emitter device to have simple relative geometry as explained above.

The inventors have developed technological improvements to techniques to address these and other inefficiencies. According to some embodiments, the techniques can include interpolating object characteristics using stored associations, such as associations between known values of the characteristic with representations of a laser line projection in the image. Such techniques can avoid using complex computations, such as triangulation computations. For example, the techniques described herein do not require performing an intermediate step of converting 2D image measurements of the object surface to 3D locations using known 3D relationships among the system components, as often performed using triangulation computations. Instead, the techniques can determine the object characteristics in a manner such that the 3D positions and orientations (e.g., the pose) of the camera, object, and/or laser device need only be known relative to their original 3D positions and orientations, and not necessarily to each other, regardless of whether the laser device is physically affixed directly to the camera or separately mounted elsewhere. Tedious calibration procedures and equipment are therefore unnecessary using the techniques described herein.

As an illustrative example, the techniques can be used to determine a presence or absence of the object, to estimate a 3D bounding box of the object, to classify a box as a standard box size and/or to verify the box is legal-for-trade, to estimate optimal parameters for reading symbols (e.g., for barcodes, module size) and/or characters (e.g., stroke width), to determine a 3D alignment estimation for 3D operations (e.g., accurate 3D pose refinement), and/or the like. It should be appreciated that various types of symbols can be read using the techniques described herein, including barcodes, two-dimensional codes, fiducials, hazmat, machine readable code, non-direct part marks, etc.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

FIG. 1 shows an exemplary system 100 for measuring a characteristic of an object, according to some embodiments. The exemplary system 100 includes a camera 102 (or other imaging acquisition device) and a computer 104. The computer 104 includes one or more processors and a human-machine interface in the form of a computer display and optionally one or more input devices (e.g., a keyboard, a mouse, a track ball, etc.).

Camera 102 includes, among other components, a lens 106 and may further include a camera sensor element (not illustrated). The camera 102 is configured to capture a digital image of the camera's field of view 108 and provides that image to a processor that forms part of computer 104. According to some embodiments, the computer 104 and camera 102 may be comprised in a same device (e.g., a smartphone or tablet device may include a camera 102 and computer 104 as well as a processor).

As shown in the example of FIG. 1, object 110 travels along a ground surface 112 (e.g., such as provided on a conveyor) into the field of view 108 of the camera 102. The camera 102 can generate one or more digital images of the object 110 while it is in the field of view 108 for processing, as discussed further herein. In operation, the ground surface can have a plurality of objects atop it. These objects can pass, in turn, within the field of view 108 of the camera 102, such as during an inspection process. As such, the camera 102 can acquire at least one image of each observed object 110. As discussed further herein, the objects 110 can be training objects used during configuration or set-up and/or runtime objects that are being processed after configuration or set-up (e.g., as part of an inspection process).

The system 100 also includes a laser line emitting device 114, configured to emit one or more laser lines 116. The laser lines 116 can project a line 118 onto the object 110 and/or the ground surface 112 (e.g., of a conveyor belt), such as during the object's passage through the field of view 108. In some embodiments, rather than emitting one or more laser lines, the laser line emitting device 114 may project laser light from one or more sources through an aperture to project a line 118 onto the object. In some examples, the aperture may be a linear aperture or may not be a linear aperture (e.g., curved). The projected line 118 may also be linear, substantially linear, a contour that is non-linear and/or discontinuous, curved, and/or the like.

The laser line emitting device 114 and camera 102 may be mounted, or otherwise fixed above the ground surface, such that the digital image may be an image of the laser line projected on the object and/or ground surface (e.g., of a conveyor belt). According to some embodiments, the position (e.g., pose, angle, location, etc.) of the camera and/or laser line emitting device may be adjusted such that the camera field of view is configured to capture a substantial portion of the laser line projection. If the laser line emitting device is used to project a laser line projection over the object in multiple positions (e.g., by changing the laser angle or moving it laterally), the camera position may be adjusted such that a field-of-view 108 is able to capture a maximal or substantially maximal range of the laser line projection as possible. The positions and orientations of the laser or camera can otherwise be arbitrary, as long as they are either fixed relative to each other and the surface, or configured so that their positions relative to the original training positions and orientations can be measured. In some embodiments, the system processes the one or more digital images from the camera 102. The one or more digital images received from the camera 102 can include, for example, one or more images of the laser line projected on the object and/or ground surface. According to some embodiments, the camera 102 may be configured to acquire an image of the surface with appropriate lighting and focus, such that the laser line projections in each of the images can be measured. For example, the camera may comprise imaging settings which may be automatically or manually configured to sufficiently capture the laser line projections.

Examples of computer 104 can include, but are not limited to a single server computer, a series of server computers, a single personal computer, a series of personal computers, a minicomputer, a mainframe computer, and/or a computing cloud. The various components of computer 104 can execute one or more operating systems, examples of which can include but are not limited to: Microsoft Windows 11™; Microsoft Windows Server™; Novell Netware™; Yocto Linux™; Redhat Linux™, Unix, and/or a custom operating system, for example. The one or more processors of the computer 104 can be configured to process operations stored in memory connected to the one or more processors. The memory can include, but is not limited to, a hard disk drive; a flash drive, a tape drive; an optical drive; a RAID array; a random-access memory (RAM); and a read-only memory (ROM). As described herein, the computer may be embodied by various portable and/or multi-functional devices, such as cell phones, tablets, smart cameras, and/or the like.

As described herein, techniques are provided for measuring characteristics of an object. The techniques may be used for measuring and/or estimating 3D surface characteristics of an object with respect to a planar surface, such as a package on a conveyor belt. As described above, such characteristics might be used to determine a presence and/or absence of an object, to estimate a 3D bounding box of the object, to classify an object as having a standard box size or verifying and/or determining legal-for-trade status, to estimate the optimal parameters for reading symbols (e.g., for barcodes, module size) or characters (e.g., stroke width), or to estimate a 3D alignment for accurate 3D pose refinement. According to some embodiments, the techniques can include determining and storing associations between known values of the characteristic of interest with extracted imaged laser stripe parameters (e.g., such as representations of the laser line projections from received images), and subsequently measuring the characteristic of a new object in an image by interpolating using the stored associations. For example, the stored associations can include storing a height of the ground surface as a base height, and a height of one or more known, measured objects, such that the height of new objects can be interpolated based on the height of the ground surface and the known object heights.

Figure 2:
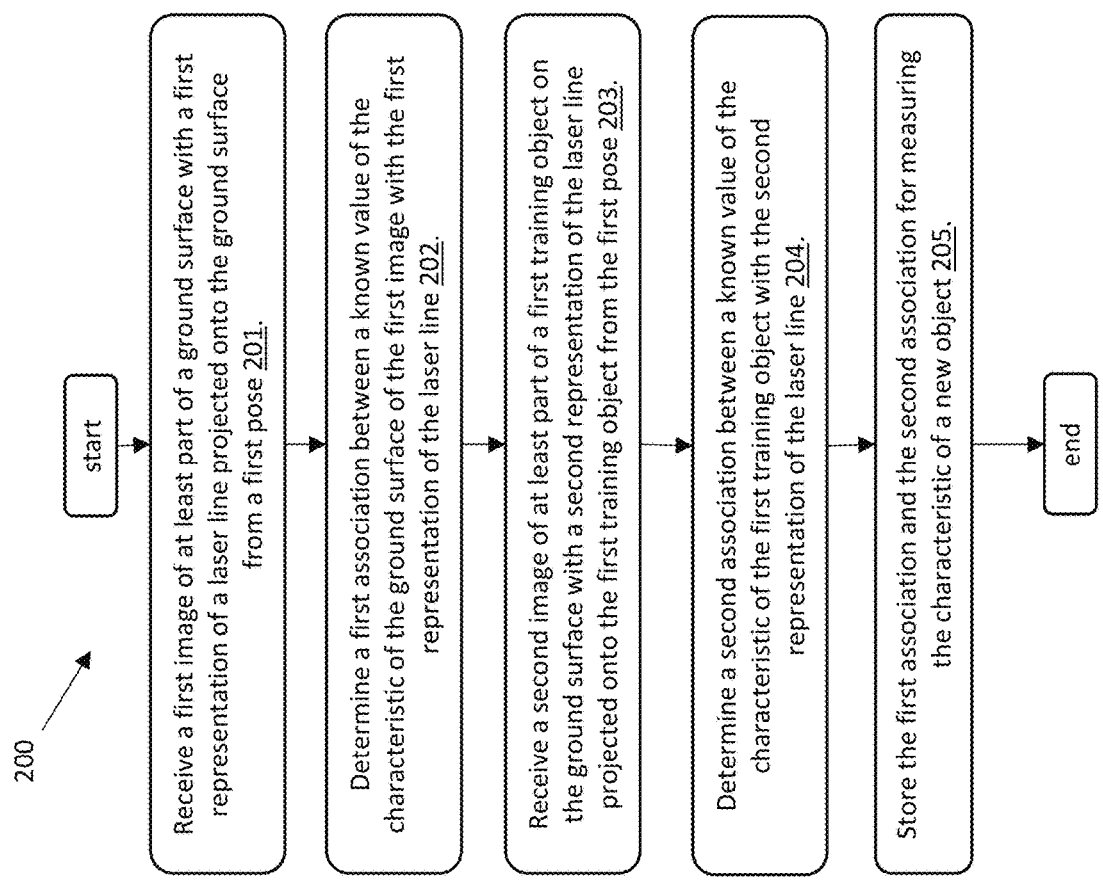
FIG. 2 is a flow chart showing an exemplary computerized method for measuring a surface characteristic of an object, according to some embodiments.

FIG. 2 is a flow chart showing an exemplary computerized method 200 for identifying a characteristic of an object (e.g., a height, width, depth, module size, and/or the like) using a plurality of images, according to some embodiments. As described herein, the plurality of images may be digital images of the camera's field of view such as field of view 108 of FIG. 4A.

Figure 4A:
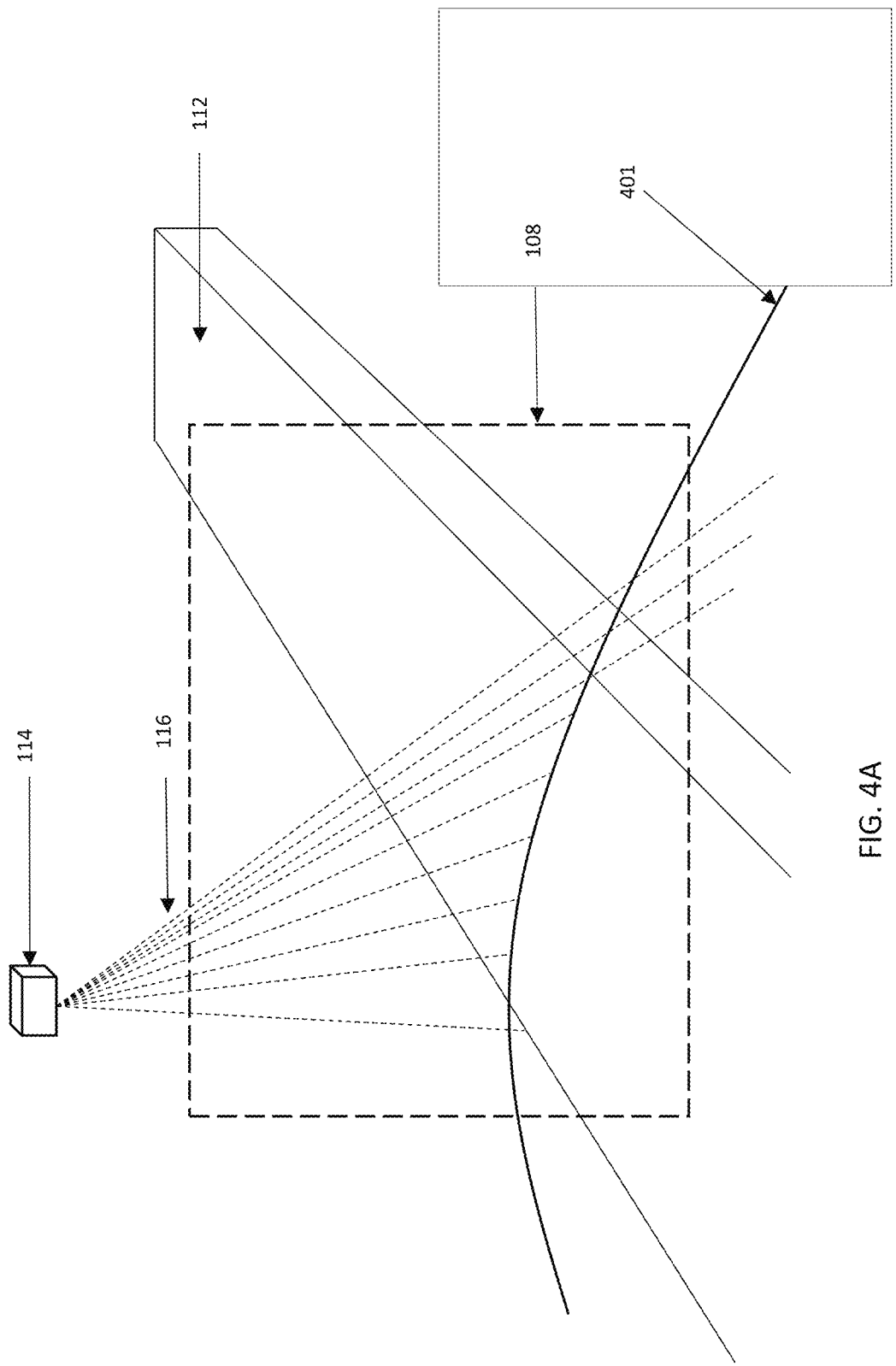
FIG. 4A is a diagram showing a exemplary laser line projection, according to some embodiments.
Figure 4D:
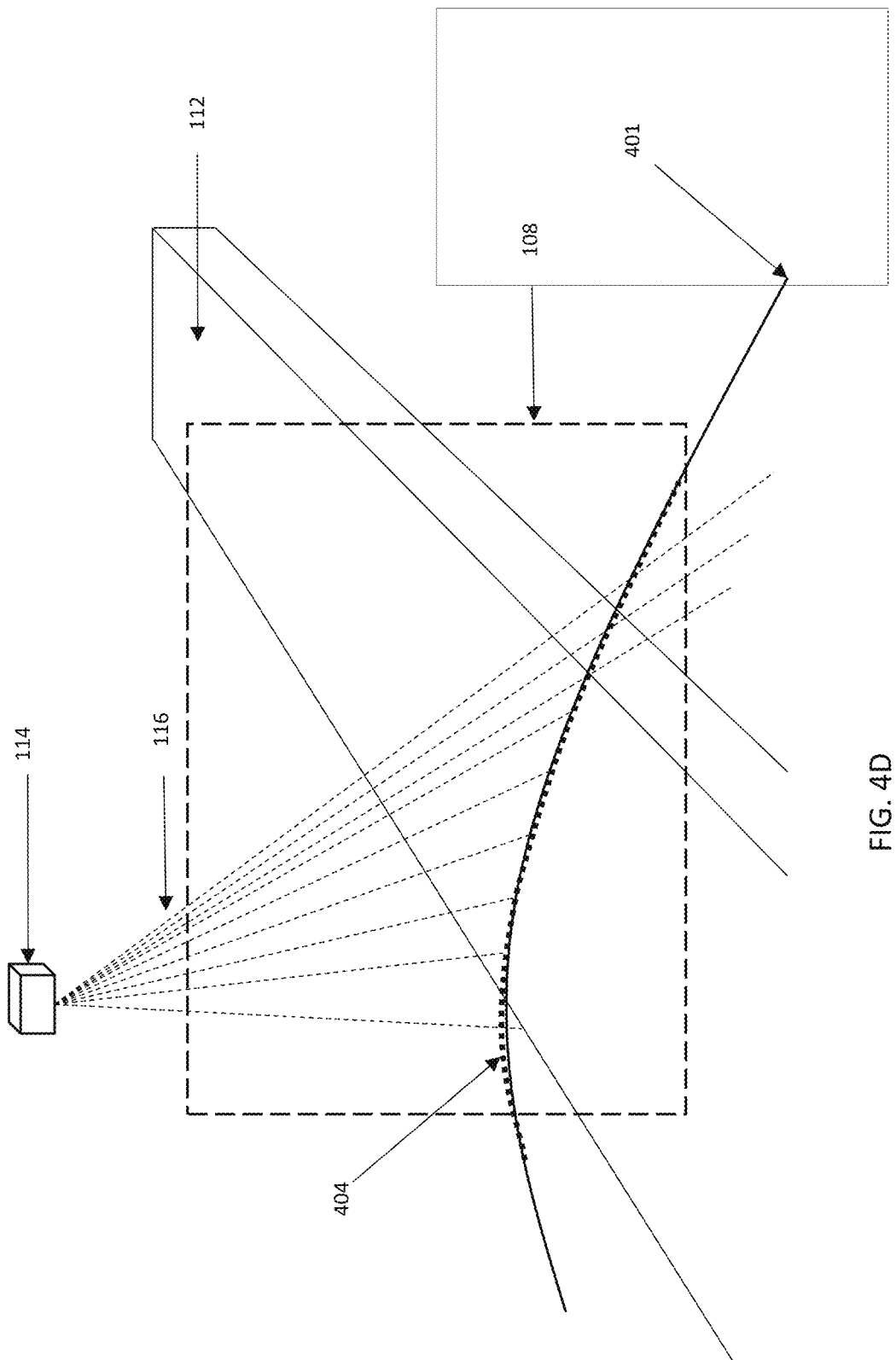
FIG. 4D is a diagram showing a representation of the exemplary laser line projection of FIG. 4A as a set of points, according to some embodiments.

At step 201, the system (e.g., the system 100 of FIG. 1) receives a first image of at least part of a ground surface with a first representation of a laser line projected onto the ground surface from a first pose. According to some embodiments, the laser line projected onto the ground surface may have a non-linear shape such as a curve. For example, the projection may be curved due to lens distortion (e.g., barrel distortion), or due to the way the laser is projected (e.g., sweeping a laser beam through an optical system involving lenses or mirrors). FIG. 4A shows an exemplary first image of the ground surface 112 with a curved laser line projection 401. The laser line projection may be represented in a variety of manners. For example, FIG. 4B-D show examples of different exemplary representations of a laser line projection 401. According to other embodiments, the laser line projected onto the ground surface may have a linear shape. For example, FIG. 5A shows a linear laser line projection. As described herein, the laser line projection may be represented as a line, a curve, a set of points, and/or the like.

At step 202, the imaging system determines a first association between a known value of the characteristic of the ground surface of the first image with the first representation of the laser line. As described herein, for example, step 202 can be used to determine the base height of the ground surface along which objects are traveling in view of the camera and laser line.

At step 203, the imaging system receives a second image of at least part of a first training object on the ground surface with a second representation of the laser line projected onto the first training object from the first pose. As described further herein, for example, step 203 can receive an image of an object with a known characteristic (e.g., a known height).

At step 204, the system determines a second association between a known value of the characteristic of the first training object with the second representation of the laser line. For example, the system can associate a known height of the imaged object with the second representation of the laser line.

At step 205, the system stores the first association and the second association for measuring the characteristic of a new object. For example, the system may store the first and second associations as part of a lookup table, sorted list, or other indexable data structure. As described further herein, the first and second associations (and additional associations, as desired) can be interpolated among in order to determine characteristics of new objects. The new object can be, for example, a runtime object that is processed after determining the associations. For example, the first association and the second association can be determined as part of a configuration or set-up step, and stored for use during runtime to process new objects. According to some embodiments, the method may include further steps for measuring the characteristic of a new object. For example, FIG. 3 is a flow chart 300 showing an exemplary computerized method 300 for measuring the characteristic of an object. The flow chart 300 includes steps 201-205 of method 200 and further includes receiving an image of at least part of the new object on the ground surface with a third representation of the laser line projected onto the new object from the first pose at step 301, and measuring the characteristic of the new object by interpolating using the third association and the stored first and second associations at step 302.

As described herein, various representations of an exemplary laser line projection may be used in the techniques described herein. For example, FIG. 4A is a diagram showing an exemplary laser line projection 401 and FIG. 4B-D show different representations of the laser line projection 401. In FIG. 4A, the laser emitting device 114 is configured to emit a plurality of laser lines 116 onto the ground surface 112. The emitted laser lines can form a laser line projection 401 on the ground surface and the camera 102 may capture an image of the field of view 108 showing the laser line projection on the ground surface.

According to some embodiments, the laser line projected onto the ground surface may have a non-linear shape such as a curve. For example, the projection may be curved due to lens distortion (e.g., barrel distortion), or due to the way the laser is projected (e.g., sweeping a laser beam through an optical system involving lenses or mirrors). In some embodiments, the curvature of the laser line projection can be corrected, for example by calibrating the lens to extract a lens distortion model and unwarping the image with this model prior to extracting (e.g., measuring) the laser line projection, or by correcting the laser line projection after measurement in the uncorrected lens-distorted image. The laser line projection 401 may be represented in various ways, including, for example, as a function such as a curve and/or a line, as a set of points, one or more curves and/or lines, and/or the like.

For example, FIG. 4B is a diagram showing a representation of the exemplary laser line projection 401 as a line 402, according to some embodiments. In some embodiments, the representation 402 of the projection 401 as a line may be determined by the computer 104 and/or by a computing component of the imaging device. For example, computer 104 may determine pixels of the laser line projection 401 based on characteristics of one or more pixels of the digital image, such as using one or more pixel values of the pixels of the digital image. Computer 104 may use the pixels and the pixel coordinates on the image to perform line fitting such as linear least squares, linear segmented regression, linear trend estimation, polynomial regression, and regression dilution to determine a representation. The linear representation 402 may be stored as a linear function on the image coordinate plane. The linear representation may also be stored as the parameters of the linear function on the image coordinate plane, such as slope and intercept coefficients.

FIG. 4C is a diagram showing a representation of the exemplary laser line projection 401 as a curve 403, according to some embodiments. According to some embodiments, the representation 403 of the projection 401 as a curve may be determined by the computer 104 or a like processor. For example, computer 104 may use pixels and pixel coordinates to perform curve fitting using one or more techniques such as regression analysis, interpolation, and smoothing to determine a representation. The representation 403 may be stored as a power function on the image coordinate plane. Alternatively, the coefficients of the power function may be stored.

In some embodiments, the representation may not be a function, but may instead be a set of points. For example, FIG. 4D is a diagram showing a representation of the exemplary laser line projection 401 as a set of points 404, according to some embodiments. According to some embodiments, the representation of 401 as a set of points may be determined by the computer 104 or a like processor. For example, computer 104 may determine one or more points based on characteristics of one or more pixels of the digital image, such as using one or more pixel values of the pixels of the digital image. In some embodiments, any combination of such representations may be used.

FIGS. 5A-B, 6A-B, 7A-B, and FIG. 8 are simplified diagrams used to illustrate the techniques described herein, so it should be appreciated that these figures are for illustrative purposes and are not intended to be limiting. Various aspects can be modified without departing from the spirit of the techniques described herein.

As described herein, measuring a characteristic may include receiving one or more images of at least part of a ground surface at one or more different poses of the camera and/or laser line emitting device. For example, in FIG. 5A, the camera 102 is configured to capture a digital image including the camera's field of view 108 of part of ground surface 112. The digital image includes a laser line projection 501 of laser lines 116 from the laser line emitting device 114 on the ground surface. The image may then be provided to a processor that forms part of computer 104. From the provided image, the computer can determine a representation 502 modelling the laser line projection 501 in the digital image. For example, the representation 502 may be determined by first locating the longest linear section of projection 501 and determining a best fit line associated with the linear section. As described herein, different representations may be used.

Figure 5B:
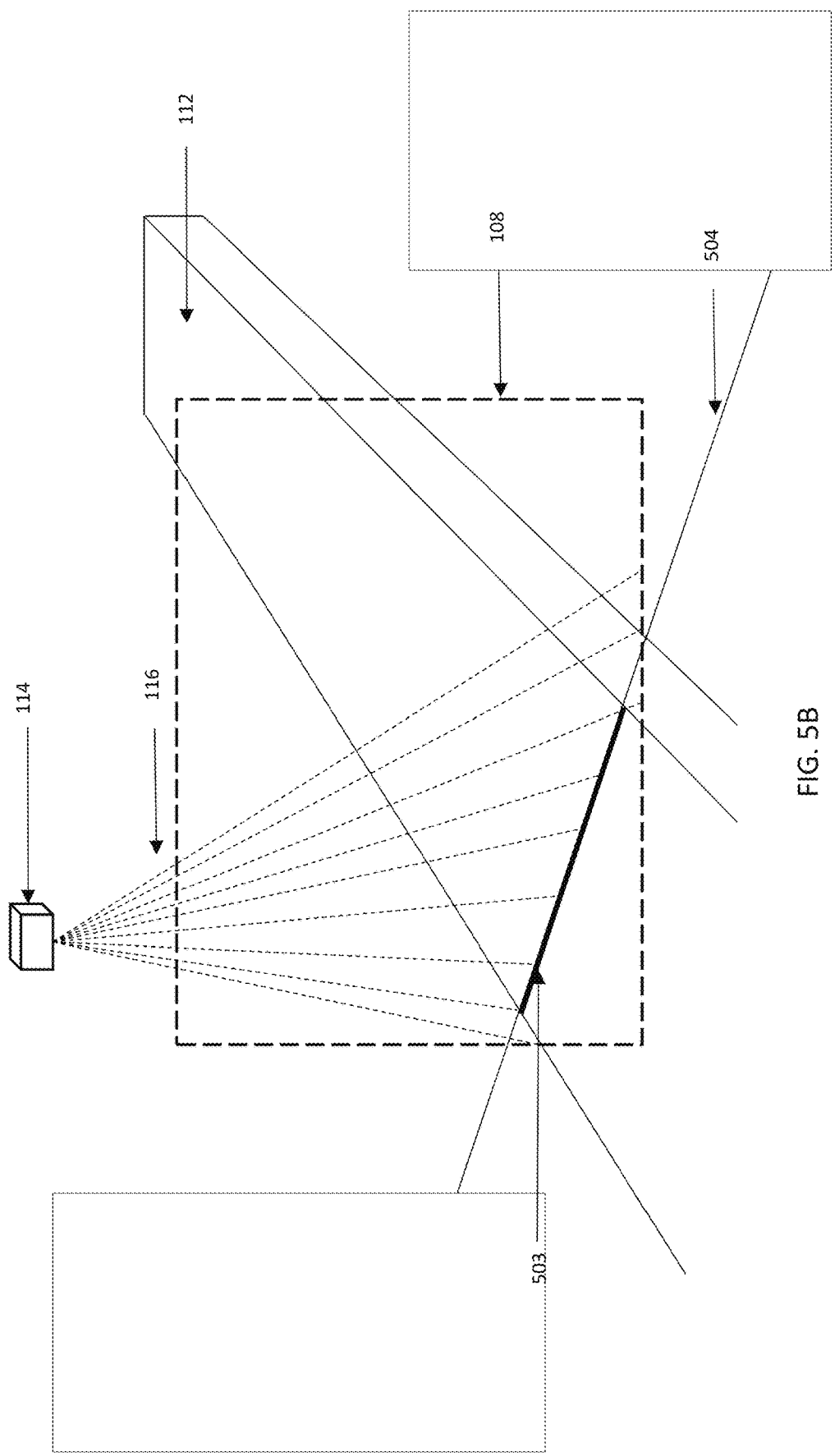
FIG. 5B is a diagram showing a laser line projection on a ground surface at a second position, according to some embodiments.

The camera 102 and/or laser line emitting device may be moved to a second pose different from a first pose used to capture the image of FIG. 5A. Changing the pose may include changing a position and/or orientation by, for example, changing the angle of either device and/or by moving either device laterally. In this example, the camera may capture a plurality of images of a laser line projection on the ground surface at different angles of the laser line emitting device. For example, FIG. 5B is a diagram showing a laser line projection on the ground surface 112 at a second pose. In the example of FIG. 5B, the laser line emitting device emits laser lines 116 at a different angle than in FIG. 5A. As described herein, camera 102 provides the image of the laser line projection 503 to computer 104. From the provided image, the computer can determine a representation 504 of the projection 503 by determining a best fit line associated with the linear section.

The computer 104 may then store an association between the representation (e.g., best fit line) and the associated pose of the camera and/or laser line emitting device. For example, the associations may be stored in a lookup table, in a sorted list, or a similar indexable structure. According to some embodiments, the absolute pose of the camera and/or laser line emitting device and their relative positions and orientations are not necessary. For example, the associations may list a relative difference of the pose from image to image.

Figure 5C:
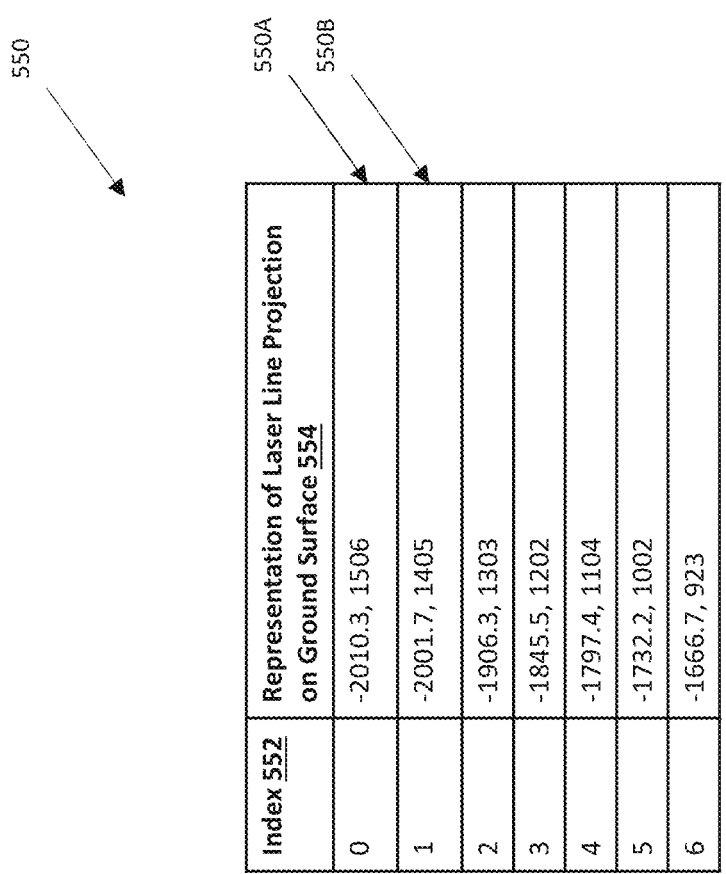
FIG. 5C is a diagram showing an example of stored associations, according to some embodiments.

For example, FIG. 5C is a diagram of exemplary stored associations 550 between orientations of the laser emitting device and representations of projections of the laser line on the ground surface. The associations are stored in a data structure having index 552 and coefficients 554 pairs. The coefficients 554 can be coefficients for a linear function representing the projection of the laser line in the received image, however as described herein, different representations may be used. For example, instead of coefficients 554, another representation that may be stored as a pair with the index 552 may include an angle of a line representing the projection and the absolute (positive) perpendicular distance from the origin (e.g., center of the image) to the line. In another example, the point on the line and an angle may be stored with the index 552. The different indexes 552 may correspond to different orientations of the laser line emitting device. For example, the different indexes 552 may be preset to correspond to different poses. An exemplary benefit of the techniques described herein is that an absolute pose of the devices is not necessary. As a result, for example, the different indices 552 may correspond to relative shifts in pose of the device. For example, an increase or decrease in index 552 could correspond to a shift in angle (e.g., by 15 degrees) or a lateral movement (e.g., left and right 5 centimeters).

In the example of FIG. 5A-C, the laser line emitting device may shift in increments of 5 degrees (e.g., index '0' may represent −30 degrees, and index '1' may represent −25 degrees). The representation of the laser line projection at each orientation of the laser line emitting device can be stored with the index corresponding to the orientation as the background line of the orientation. For example, the first entry 550A of the table of FIG. 5C may represent the stored association of the pose of the laser line emitting device and the associated linear representation 502 of the laser line projection 501 of FIG. 5A. The second entry 550B of the table of FIG. 5C may represent the stored association of the pose of the laser line emitting device and the associated linear representation 504 of the laser line projection 503 of FIG. 5B. The first entry 550A has index 552 '0', indicating that the representation of the projection corresponds to a project of the laser line emitting device at a first orientation and the second entry 550B has index 552 '1' respectively, indicating that the representation of the projection corresponds to a project of the laser line emitting device at a second orientation.

As described herein, the techniques may include receiving, from the imaging device, one or more images of at least part of a first training object (e.g., an object with known characteristic(s)) on the ground surface at one or more poses of the camera and/or laser emitting device. For example, the camera 102 may be configured to capture one or more images of training object 600 at one or more orientations of the laser emitting device, such as orientations corresponding to indexes '0' to '6' of FIG. 5C. The training object 600 may have a known value of a characteristic such as height 605.

Figure 6A:
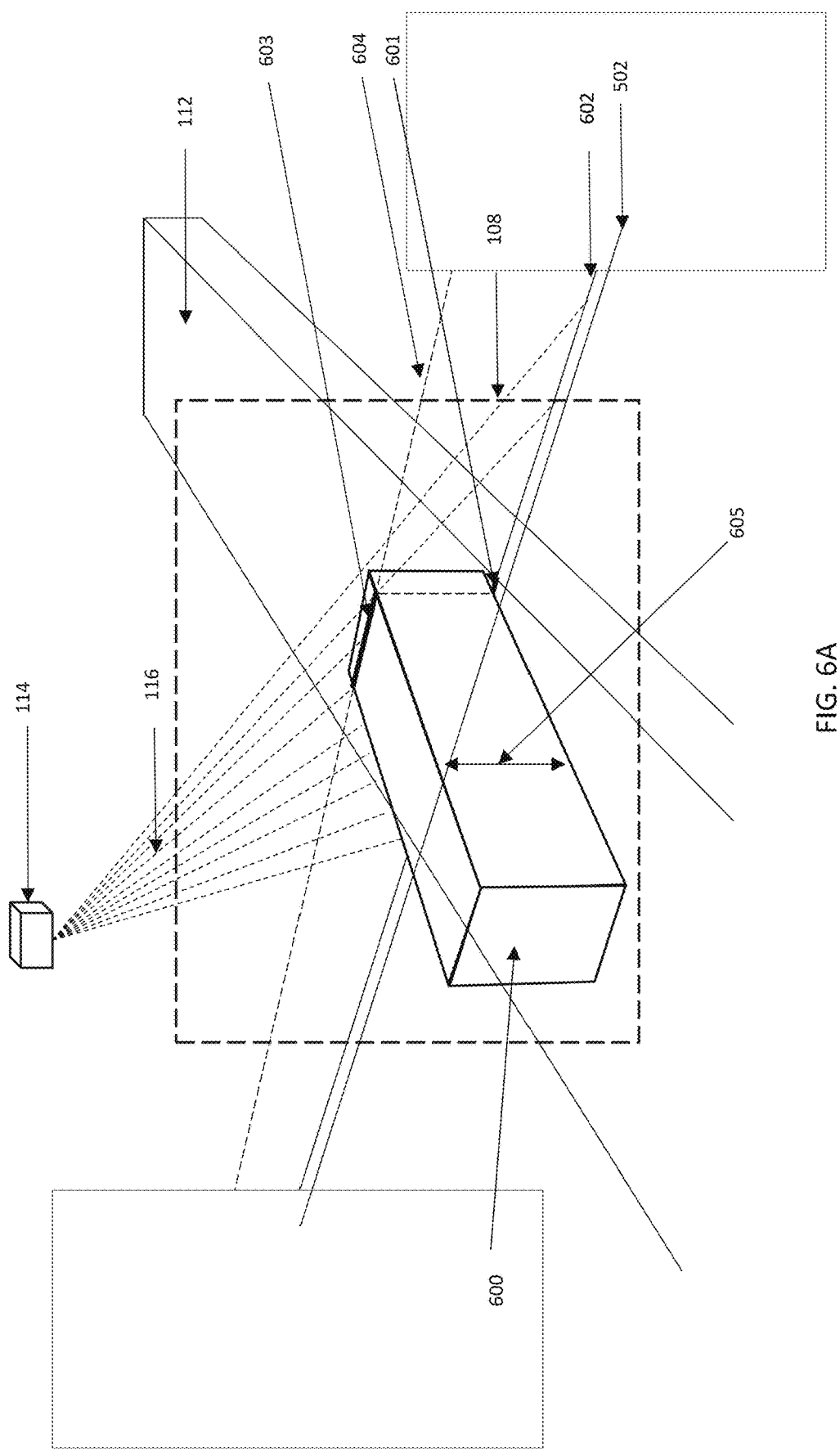
FIG. 6A is a diagram showing a laser line projection on a ground surface and a first object at a first position, according to some embodiments.

In FIG. 6A, the laser line emitting device 114 emits one or more laser lines 116 at a first pose (e.g., the pose of laser line emitting device in FIG. 5A and index '0') and projects line 601 onto the first training object 600 and line 603 onto the ground surface 112. The image may then be provided to a processor that forms part of computer 104.

As described herein, the laser line projected onto the ground surface may have a non-linear shape, such as a curve. According to some embodiments, the laser line projected onto the object may have a non-linear shape such as a curve. For example, the projection may be curved due to lens distortion (e.g., barrel distortion), or due to the way the laser is projected (e.g., sweeping a laser beam through an optical system involving lenses or mirrors).

From the provided image, the computer can determine representations 602 and 604 of the projections 601 and 603, respectively, using the methods described herein. For example, the representations 602 and 604 may be determined by locating the longest linear sections of projections 601 and 603 and determining a best fit line associated with the linear section. As described herein, different representations may be used.

According to some embodiments, determining representations 602 and 604 may include detecting and/or measuring a projection of the laser line in the image. For example, the computer and/or processor of the computer can be configured to apply a pixel value threshold to the image (e.g., captured by the camera) and locate the pixel(s) that are above (or below) the threshold. For example, pixels corresponding to values above a threshold may correspond to the projection of the laser line on the object and/or ground surface in the image. This threshold may be used to binarize the image such that only pixels having above the threshold pixel value may be indicated as white pixels along the projection. In some embodiments, the threshold may be predetermined, for example, by a user or as an output of an algorithm. In some embodiments, the threshold may be adaptive based on characteristics of the image, for example, an average of the values of the pixels, a function of the values of the pixels of the image, etc.

In some embodiments, the computer and/or processor of the computer can be configured to determine the projection of the laser line of the image by determining peaks in values of pixels along the columns of pixels of the image. For example, peaks can be determined by determining which pixels have a maximum or minimum pixel value within the column of pixels (e.g., local maxima or minima). The processor and/or computer may interpolate the position of the pixels having the maximum or minimum pixel value between the different columns to determine a projection (e.g., by fitting a Gaussian profile or a cubic polynomial). According to some embodiments, the processor of computer 104 may perform additional processing in order to determine which of the laser line projections (e.g., 601, 603) correspond to the projection on the surface of the training object. For example, the computer may first determine which of the projections correspond to the ground surface by referencing the stored background line corresponding to the first orientation. For example, the computer 104 may determine that for a first orientation of the laser line emitting device (e.g., the orientation corresponding to index '0') the background line should be a linear function with coefficients −2010.3, 1506 (e.g., from the stored association of the projections on the ground surface). The computer 104 may then determine which of the laser line projections 601 and 603 correspond to the background line for the first orientation by determining which representation of the projections is closer. In this case, the representation 602 of projection 601 is closest to the background line 502 associated with the first orientation. The representation 604 which is furthest away from the background line may then be determined to be the representation of the projection on the training object. For example, the image of FIG. 6A has a linear representation of the projection on the training object and a linear representation of the projection on the ground surface. The representation of the line projection on the training object can then be stored with the associated pose of the camera and/or laser line emitting device.

According to some embodiments, determining a closeness of two lines can include determining a distance between two lines. This can be measured, for example, using a Euclidean distance at a given x coordinate or y coordinate of the image coordinate plane.

As described herein, the camera 102 and/or laser line emitting device may be moved to a second pose different from a first pose used to capture the image of FIG. 6A by changing, for example, the angle of either device or moving either device laterally. In this example, the camera may capture a plurality of images of a laser line projection on the ground surface at different angles of the laser line emitting device.

Figure 6B:
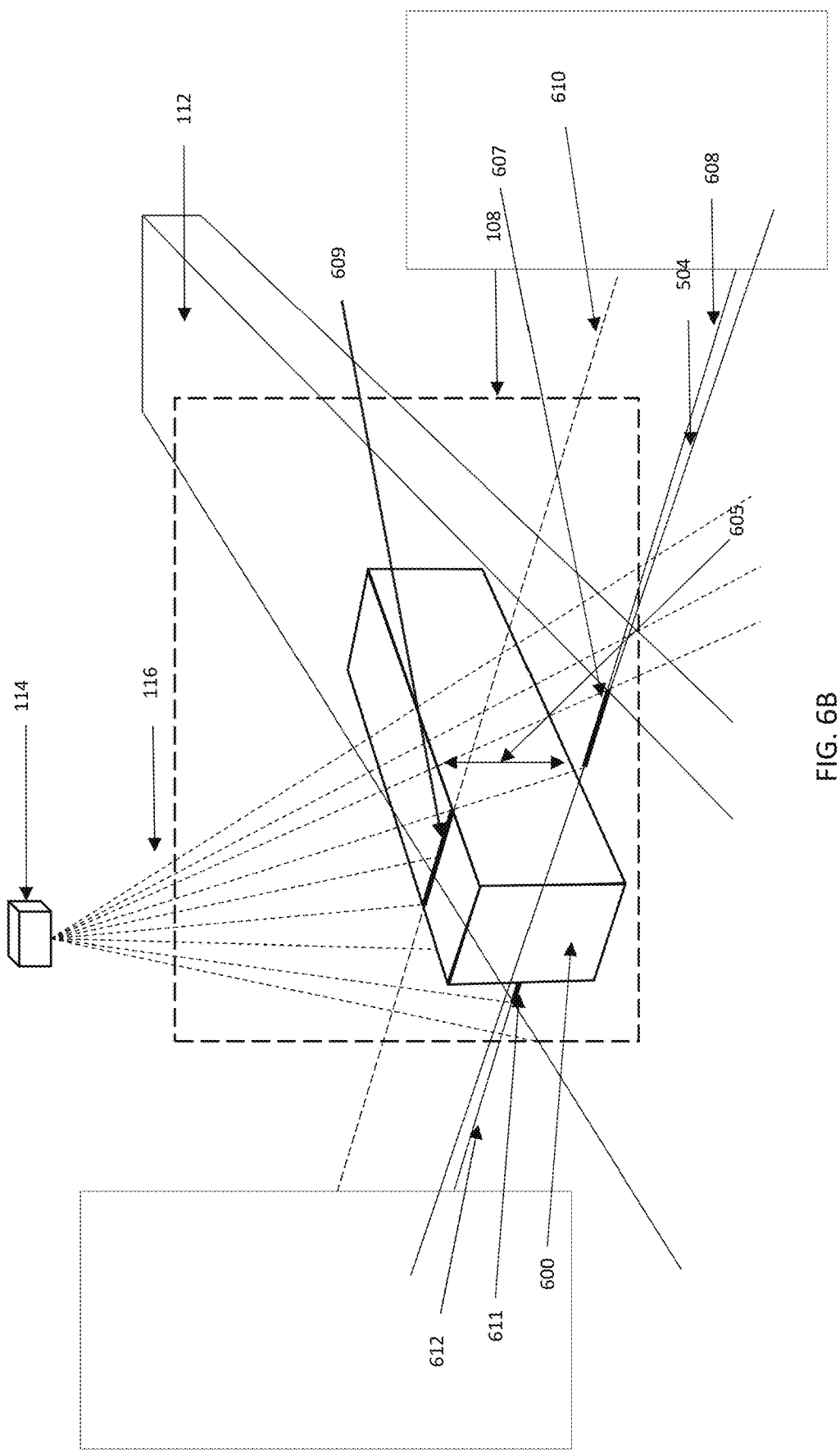
FIG. 6B is a diagram showing a laser line projection on a ground surface and the first object at a second position, according to some embodiments.

For example, FIG. 6B is a diagram showing a laser line projection on a ground surface 112 and the training object 600 at a second pose, according to some embodiments. As in the example of FIG. 5B, the laser line emitting device of FIG. 6B emits laser lines 116 at a different angle than in FIG. 6A. As described herein, camera 102 provides the image of the laser line projections 607, 609 and 611 to computer 104. From the provided image, the computer can determine a representation 608, 610, and 612 of the projections 607, 609 and 611, respectively, by determining a best fit line associated with the linear section.

The computer 104 may then store an association between the representations and the associated pose of the camera and/or laser line emitting device, as described herein. For example, FIG. 6C is a diagram of exemplary stored associations 650, according to some embodiments. The associations 650 are stored in a data structure having index 652 and coefficients 654, 656 pairs. As described herein, the coefficients 654, 656 can be coefficients for a linear function representing the projection of the laser line on the training object in the received image. The indexes may represent a relative angle of the emitted laser lines 116. For example, each increasing index may represent a shift in 15 degrees of an angle of the emitted laser lines. In the example of FIG. 6C, the associations 650 include both coefficients 654 for the representation of the laser line projection on the ground surface (e.g., as discussed in conjunction with FIGS. 5A-5C), as well as coefficients 656 for the representation of the laser line projection on the first training object (e.g., object 600 of FIGS. 6A-6B).

Figure 7A:
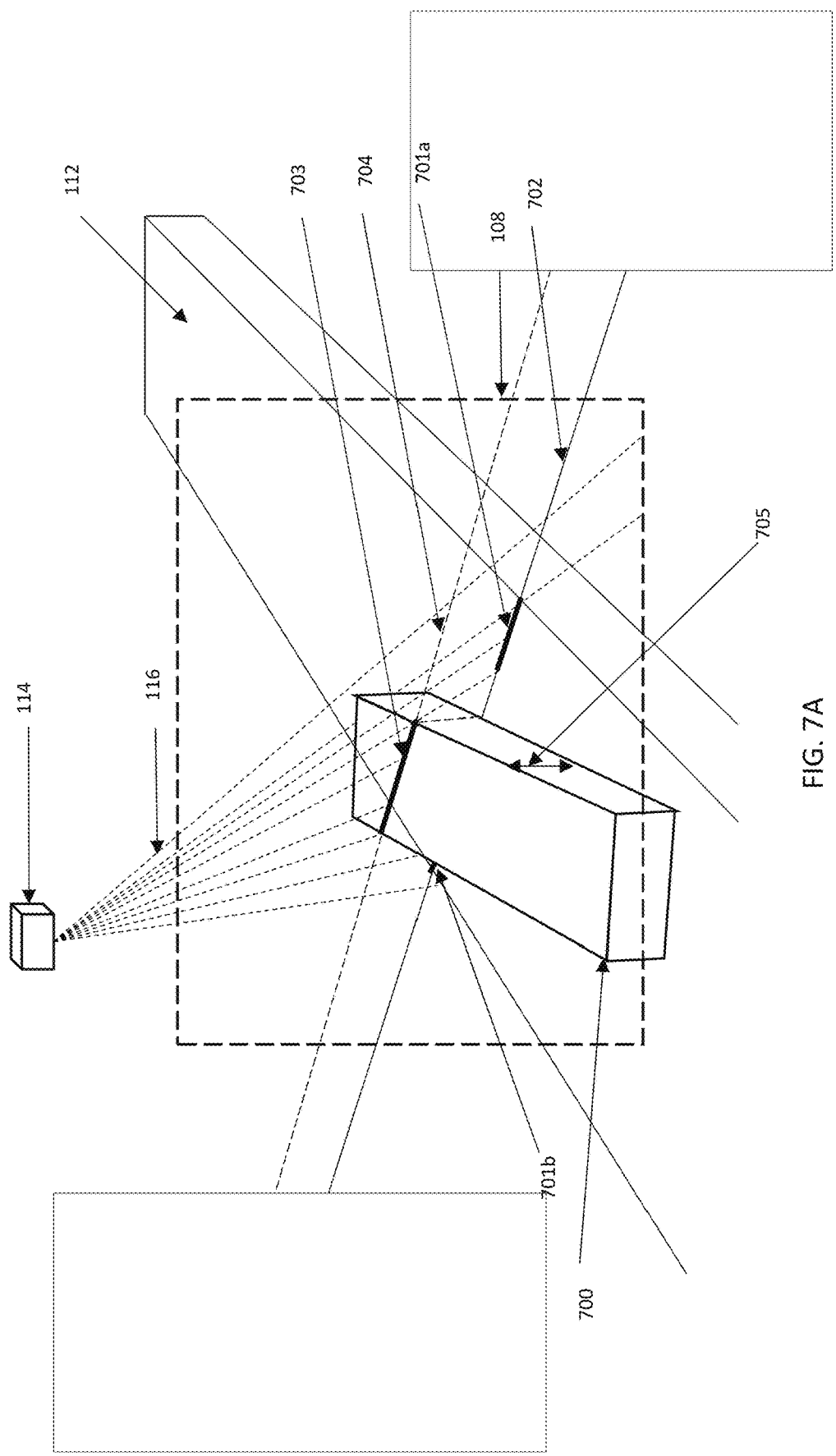
FIG. 7A is a diagram showing a laser line projection on a ground surface and a second object at a first position, according to some embodiments.

According to some embodiments, more than one training object can be used. For example, a second training object with another known value of the characteristic can be used with the techniques described herein. In some embodiments, the second training object can be chosen to have a value of the characteristic that is (substantially) different from the value of the characteristic of the first training object. In the example of FIG. 7A, training object 700 has known height 705 that is different than height 605 of object 600 in FIGS. 6A-C.

As with the training object of FIG. 6A-C, one or more images of at least part of the second training object on the ground surface may be obtained at one or more poses of the camera and/or laser emitting device. For example, the camera 102 may be configured to capture one or more images of training object 700 at one or more orientations of the laser emitting device, such as orientations corresponding to indexes '0' to '6' of FIG. 5C.

FIG. 7A is a diagram showing a laser line projection on a ground surface and a second object at a first position, according to some embodiments. In FIG. 7A, the camera 102 may be configured to capture an image of training object 700. The laser line emitting device 114 emits one or more laser lines 116 at the first pose (i.e., the pose of laser line emitting device in FIGS. 5A and 6A) and projects line 701*a* and line 701*b* onto the ground surface 112 and line 703 onto the second training object 700. The image may then be provided to a processor that forms part of computer 104.

From the provided image, the computer can determine representations 702 and 704 of the projections 701*a-b* and 703, respectively, using the methods described herein. The computer may also store the association between the orientation, the representations, and the known characteristic of training object 700.

Figure 7B:
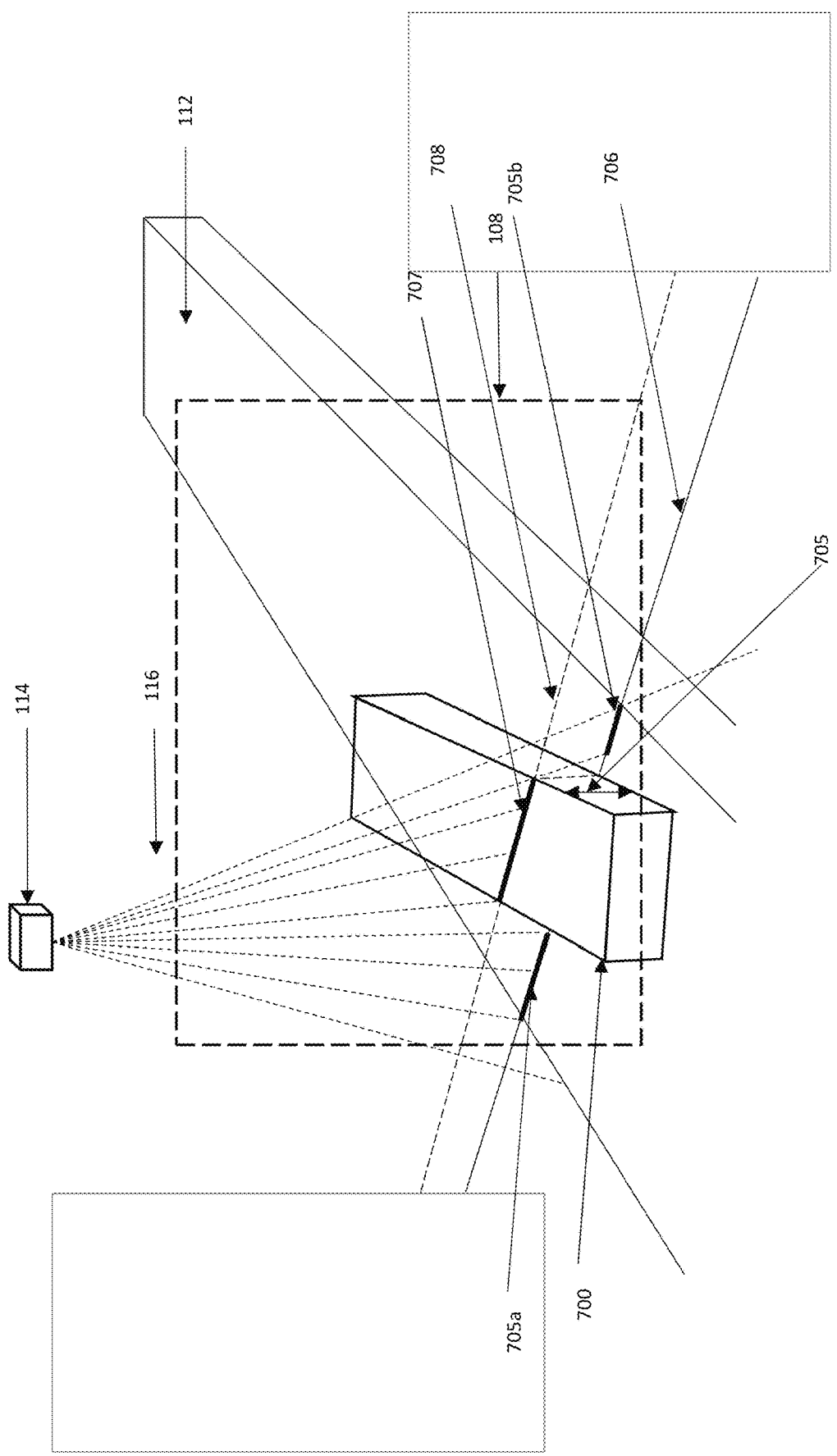
FIG. 7B is a diagram showing a laser line projection on a ground surface and the second object at a second position, according to some embodiments.

As described herein, the camera 102 and/or laser line emitting device may be moved to a second pose different from a first pose used to capture the image of FIG. 7A by changing, for example, the angle of either device or moving either device laterally. FIG. 7B shows a laser line projection on a ground surface and the second object at a second orientation. From the provided image, the computer can determine representations 706 and 708 of the projections 705*a-b* and 707, respectively, using the methods described herein.

The computer 104 may also store the association between the orientation, the representations, and the known characteristic of training object 700. For example, FIG. 7C is a diagram of exemplary stored associations 750. As described herein, the associations 750 may be stored in a data structure having index 752 and coefficients 754, 756, 758 pairs such that each index 752 corresponds to a known pose of the laser line emitting device, and for each pose, the representation of the projection of the laser line on the training objects are stored. In the example of FIG. 7C, the associations 750 include coefficients 754 for the representation of the laser line projection on the ground surface (e.g., as discussed in conjunction with FIGS. 5A-5C), coefficients 756 for the representation of the laser line projection on the first training object (e.g., as discussed in conjunction with FIGS. 6A-6C), and coefficients 758 for the representation of the laser line projection on the second training object (e.g., object 700). As described herein, the coefficients 754, 756, 758 can be coefficients for a linear function representing the projection of the laser line on the training object in the received image. In some embodiments, the indexes may represent a relative angle of the emitted laser lines (e.g., with each increasing index representing a shift in 15 degrees of an angle of the emitted laser lines).

According to some embodiments, a vanishing point, or parameters corresponding to a vanishing point, may be additionally or alternatively stored. For example, for each pose, a vanishing point of the baseline corresponding to the pose and the representation of the projection on the training object may be computed by determining where the two representations converge. In some embodiments, the vanishing point may not be defined by finite numbers (e.g., the x and/or y image coordinate may be infinity). According to some embodiments, the explicit location of the vanishing point (e.g., coordinates of the vanishing point) might not be known, but the vanishing point can still be represented (e.g., by two lines, one for each of the representations).

FIG. 7D is another diagram of exemplary stored associations, according to some embodiments. In the example of FIG. 7D, the stored associations may be three dimensional. For example, the training objects may be moved (e.g., from a first position to a second position). For example, for each position, as described herein, the associations may be stored in a data structure having index and coefficients pairs such that each index corresponds to a known pose of the laser line emitting device, and for each pose, the representation of the projection of the laser line on the training objects at each position are stored. For example, the table 791 may represent the associations with respect to a first position of the object(s), the table 792 may represent the associations with respect to a second position of the object(s) and the table 793 may represent the associations with respect to a nth position of the object(s). In this example, each table 791, 792 through 793 is shown as including an index 791A, 792A, and 793A, coefficients 791B, 792B, and 793B for the representation of the laser line projection on the ground surface (e.g., as discussed in conjunction with FIGS. 5A-5C), coefficients 791C, 792C, and 793C for the representation of the laser line projection on the first training object (e.g., as discussed in conjunction with FIGS. 6A-6C), and coefficients 791D, 792D, and 793D for the representation of the laser line projection on the second training object. However, this is for exemplary purposes only and not intended to be limited, as any number of coefficients can be used in accordance with the techniques described herein. In some examples, the stored associations may be four dimensional in the case that the training object, the laser line emitting device, and the camera are configured to move in different positions.

According to some embodiments, the computer 104 is configured to fit a parametric perspective model for each pose of the camera and/or laser emitter in relation to the object. The computer 104 may be configured to use perspective geometry and/or lens geometry to compute best fit parameters (e.g., coefficients) for a model (e.g., function) that maps the representations of the projection lines to the known characteristics (e.g., height) of the training objects. The computer 104 can store the associated computed model parameters for each pose.

As described herein, the stored associations can be used to determine and/or measure a characteristic of a new object on the ground surface (e.g., a conveyor belt surface). An image of the new object on the ground surface can be obtained by the camera at one or more poses (e.g., at one or more orientations of the laser line emitting device). For each pose, the camera may obtain a digital image and compute surface characteristics along each projection. For example, in some embodiments, the camera may sample points of the projection and/or representation of each projection and compute a surface point perspective line for each sampled point of the projection and/or representation of the projection.

The computer 104 may then use associated model coefficients to determine the interpolated value of the characteristic. For example, the computer 104 may determine lines in the image from each sampled point through the vanishing point associated with the sampled orientation. Interpolation can comprise any known interpolation technique, including linear interpolation, interpolation between two curves, piecewise constant interpolation, polynomial interpolation, spline interpolation, etc.

Figure 8:
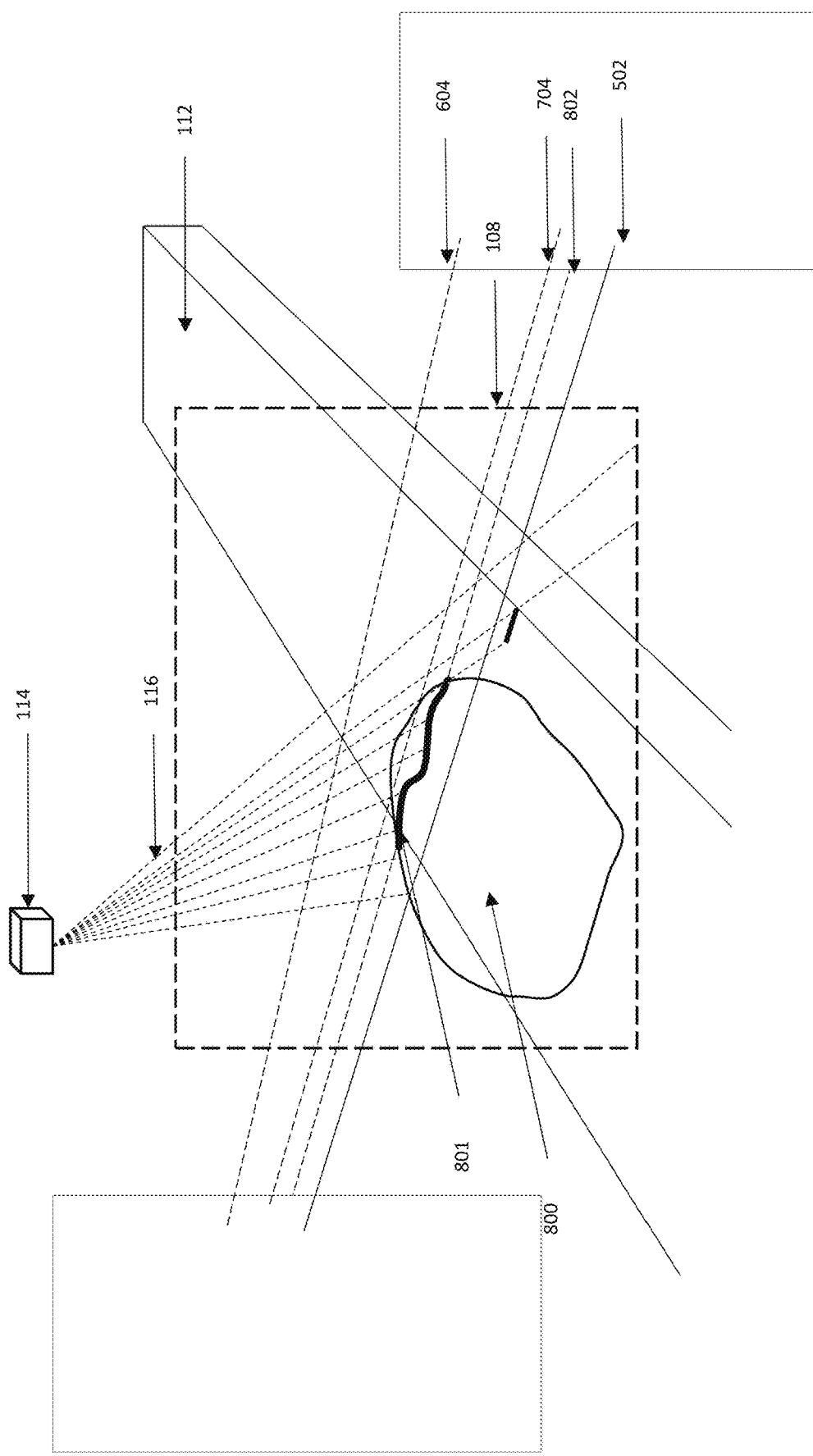
FIG. 8 is a diagram showing a laser line projection on a ground surface and a new object at a first position, according to some embodiments.

FIG. 8 shows a laser line projection on a ground surface and a new object at a first position. Line 502 represents the laser line projection on the ground surface at the first position. Line 604 represents the laser line projection on the first training object at the first position. Line 704 represents the laser line projection on the second training object at the first position. The computer 104 may then interpolate line 802 corresponding to a representation of projection 801 of the laser line on new object 800 using the stored representations to determine a measurement for the height. For example, the line 802 may be determined to be halfway between lines 502 and 704. Line 502 represents height 0, while line 704 may represent a height of 1. As such, the computer may determine the height of new object 800 to be halfway between 0 and 1, i.e., 0.5.

In some embodiments, the computing device may use a perspective model to determine measurements of new objects, such as height measurements (e.g., rather than and/or in addition to performing interpolation). For example, the computing device can generate a perspective model based on the stored associations. The computing device can then use the perspective model to analyze laser line projections.

According to some embodiments, only the relative pose of one of the camera, object, or laser may be changing. In this example, interpolation may occur in two dimensions. For example, the dimensions may be the measured characteristic (e.g., height in the example of FIG. 8) and the other dimension may be the relative pose of one of the camera, object, or laser. In some examples, the relative pose of two or more of the camera, object and/or laser may change. In these examples, the interpolation may occur in three or more dimensions. According to some embodiments, the accuracy of the system may increase given a smaller difference in the relative positions of the camera and/or laser line emitting device.

According to some embodiments, the determined characteristics may be used to make further measurements and/or decisions. For example, the system can perform interpolation as described herein to compute one or more characteristics of an object (e.g., object eight) and use the determined one or more characteristics to determine another characteristic of the object. For example, if the object includes a symbol, the system can use a determined height for reading the symbol. For example, for a barcode printed on the top of the object, the system can be configured to use a determined height of the object to determine one or more characteristics of the barcode (e.g., an approximate module size of the barcode). As another example, the system can be configured to store width measurements for interpolation, and the system can determine an estimated width of the barcode based on the stored width measurements. In some embodiments, the system can be configured to store the additional and/or alternative characteristics for interpolation (e.g., the system can store barcode characteristics, such as barcode width, barcode height, module size, etc.) based on one or more known barcodes (e.g., as discussed herein), and use the stored data to interpolate barcode characteristics for new barcodes imaged during runtime.

In some embodiments, for example, embodiments where an optical axis of the camera is perpendicular to the ground plane, the image distance measurements may be associated with characteristics such as module size or stroke width instead of having to measure the height of the boxes and indirectly compute these dimensions. For example, a same barcode or two barcodes having a same or substantially the same known module size (e.g., in pixels) may be placed on a ground plane (e.g., the barcode laying on the surface) and a training object (e.g., with unknown height). The image module size could be interpolated using the stored associations of the known module sizes such that the module sizes may be determined prior to decoding the barcode at a particular position on a new object. In some examples, rather than a module size, the characteristic may be an image stroke width or apparent character scale for text printed with a consistent font.

In some embodiments, the camera may be configured to automatically adjust an optical focus setting for the ground plane and for at least one other training object. The optical focus setting (e.g., in diopters) may be stored as an association along with a known characteristic (e.g., height, module size, etc.), and then the optical setting (e.g., diopters) and stored associations may be used to interpolate to determine a value for the characteristic using techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A computerized method for measuring a characteristic, the method comprising:
   receiving, from an imaging device, a first image of at least part of a ground surface with a first representation of a laser line projected onto the ground surface from a first pose;
   determining a first association between a known value of the characteristic of the ground surface of the first image with the first representation of the laser line projected onto the ground surface;
   receiving, from the imaging device, a second image of at least part of a first training object on the ground surface with a second representation of the laser line projected onto the first training object from the first pose;
   determining a second association between a known value of the characteristic of the first training object with the second representation of the laser line projected onto the first training object; and
   storing the first association and the second association for measuring the characteristic of a new object.

2. The computerized method of claim 1, further comprising:
   receiving, from the imaging device, an image of at least part of the new object on the ground surface with a third representation of the laser line projected onto the new object on the ground surface from the first pose; and
   measuring the characteristic of the new object by interpolating using the stored first association and second association.

3. The computerized method of claim 2, wherein the first representation and/or the second representation are linear approximations and wherein interpolating comprises linear interpolation.

4. The computerized method of claim 2, wherein the first representation and the second representation comprise first and second parametrized curves, respectively, and wherein interpolating comprises interpolating between the first and second curves.

5. The computerized method of claim 2, wherein the first representation and the second representation comprise first and second sets of points, respectively, and wherein interpolating comprises interpolating between points of the first and second sets of points.

6. The computerized method of claim 1, wherein the laser line projected onto the ground surface is projected using a laser emitting device.

7. The computerized method of claim 1, further comprising:
   receiving, from the imaging device, a third image of at least part of a second training object on the ground surface with a third representation of the laser line projected onto the second training object from the first pose;
   determining a third association between a known value of the characteristic of the second training object with the third representation of the laser line projected onto the second training object; and
   storing the third association for measuring the characteristic of the new object.

8. The computerized method of claim 2, wherein the third representation intersects with the first representation and/or the second representation at a vanishing point.

9. The computerized method of claim 1, wherein the characteristic is a distance above the ground surface.

10. The computerized method of claim 2, wherein interpolating comprises determining whether the third representation is between the first representation and the second representation.

11. The computerized method of claim 10, wherein the characteristic indicates detectability if the third representation is determined to be between the first representation and the second representation.

12. The computerized method of claim 1, wherein the characteristic is an optimal parameter value for reading a symbol on a surface of the first training object.

13. The computerized method of claim 1, wherein the characteristic is a module size for a symbol on a surface of the first training object.

14. The computerized method of claim 6, further comprising:
   moving the imaging device and/or laser emitting device from a first position to a second position;

receiving, from the imaging device, a third image of at least part of the ground surface with a third representation of a laser line projected onto the ground surface from a second pose;

determining a third association between a known value of the characteristic of the ground surface of the third image with a third representation of the laser line projected onto the ground surface;

receiving, from the imaging device, a fourth image of at least part of a first training object on the ground surface with the fourth representation of the laser line projected onto the first training object from the second pose;

determining a fourth association between a known value of the characteristic of the first training object with the fourth representation of the laser line projected onto the first training object; and storing the third association and the fourth association for measuring the characteristic of the new object.

15. The computerized method of claim 13, further comprising:

receiving, from the imaging device, an image of at least part of the new object on the ground surface with a fifth representation of the laser line projected onto the new object on the ground surface from the first pose; and measuring the characteristic of the new object by interpolating using the stored first association, second association, third association and/or fourth association.

16. The computerized method of claim 2, wherein interpolating is performed using principles of perspective projection.

17. The computerized method of claim 14, further comprising:

determining a mapping using the known value of the characteristic of the ground surface, the known value of the characteristic of the first training object, a difference in the first position and second position, and points corresponding to the surface of the new object.

18. The computerized method of claim 17, wherein the characteristic is a height, and wherein the mapping is a two dimensional (2D) mapping of the heights of the points corresponding to the surface the new object represented as a point cloud.

19. The computerized method of claim 1, wherein the first training object is a box.

20. A non-transitory computer-readable media comprising instructions that, when executed by one or more processors on a computing device, are operable to cause the one or more processors to measure a characteristic, comprising:

receiving, from an imaging device, a first image of at least part of a ground surface with a first representation of a laser line projected onto the ground surface from a first pose;

determining a first association between a known value of the characteristic of the ground surface of the first image with the first representation of the laser line projected onto the ground surface;

receiving, from the imaging device, a second image of at least part of a first training object on the ground surface with a second representation of the laser line projected onto the first training object from the first pose;

determining a second association between a known value of the characteristic of the first training object with the second representation of the laser line projected onto the first training object; and storing the first association and the second association for measuring the characteristic of a new object.

21. An apparatus comprising a processor configured to execute programming instructions to perform:

receiving, from an imaging device, a first image of at least part of a ground surface with a first representation of a laser line projected onto the ground surface from a first pose;

determining a first association between a known value of a characteristic of the ground surface of the first image with the first representation of the laser line projected onto the ground surface;

receiving, from the imaging device, a second image of at least part of a first training object on the ground surface with a second representation of the laser line projected onto the first training object from the first pose;

determining a second association between a known value of the characteristic of the first training object with the second representation of the laser line projected onto the first training object; and storing the first association and the second association for measuring the characteristic of a new object.

* * * * *